Jan. 12, 1932. T. BENNETT 1,840,430

PIPE CONNECTION

Filed Oct. 18, 1930

INVENTOR
Thomas Bennett
by Parker & Prochnow
ATTORNEYS

Patented Jan. 12, 1932

1,840,430

UNITED STATES PATENT OFFICE

THOMAS BENNETT, OF PERRY, NEW YORK, ASSIGNOR TO KAUSTINE COMPANY, INC., OF PERRY, NEW YORK, A CORPORATION OF NEW YORK

PIPE CONNECTION

Application filed October 18, 1930. Serial No. 489,601.

This invention relates to pipe connections for tanks, and more particularly to connections of this kind by means of which sewer pipe or tile may be connected with a tank.

The objects of this invention are to provide a connection of this kind with stop means of improved construction for restricting the extent to which a pipe may be inserted into the connection; also to provide a connection of this kind with tapering stop portions which are capable of cooperating with pipes of different sizes to limit the extent to which they may be inserted into the connection; also to provide a pipe connection of this kind with stops formed integral with the connection and spaced at intervals to leave portions of the pipe connection free from obstructions to the flow of liquid; also to improve pipe connections of this kind in other respects hereinafter specified.

In some types of tanks, it is very necessary that the pipes leading to and from the tank terminate approximately at the wall of the tank. For example, in the construction shown in Fig. 1, a septic tank A is illustrated having an inlet opening B and a discharge opening C. In tanks of this kind baffles D are provided, which extend across the inlet and discharge openings, and which are secured to the wall of the tank and which extend downwardly below the liquid level in the tank, so that liquid flowing into or discharged from the tank will not disturb the material which is being treated in the intermediate portions of the tank. These tanks are frequently installed by unskilled persons, and it sometimes happens that the sewer pipes or tile E and F are inserted through the openings B and C to such an extent that the inner end of the pipes extend into very close proximity to the baffles D. Consequently, the ends of the pipes E and F are so reduced in size and obstructed that they quickly become clogged. By means of my invention, stops of improved construction are provided which engage the ends of the pipes, or tile, which are to be inserted into the pipe connections to limit the extent to which they may be inserted into these connections.

Figure 1:
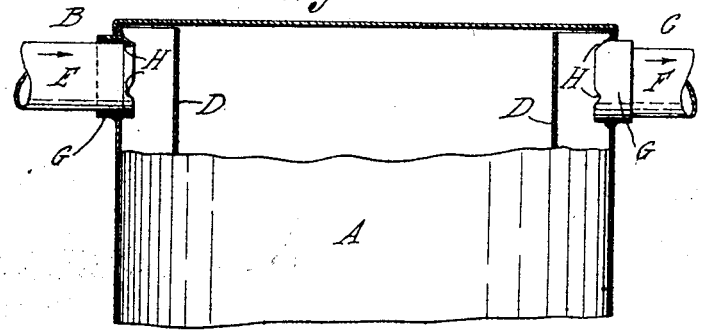
Fig. 1 is an elevation, partly in section, of a tank provided with pipe connections embodying this invention.
Figure 2:
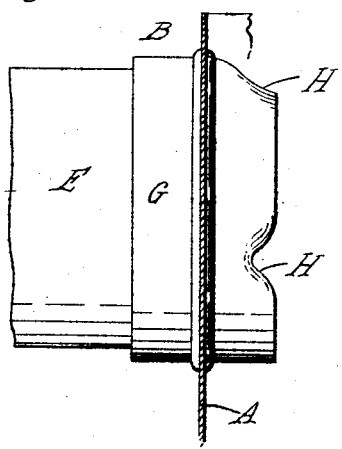
Fig. 2 is a sectional fragmentary view, showing a portion of the wall of a tank and a pipe connection secured thereto, and a pipe arranged within the pipe connection, the section being taken on line 2—2, Fig. 3.
Figure 3:
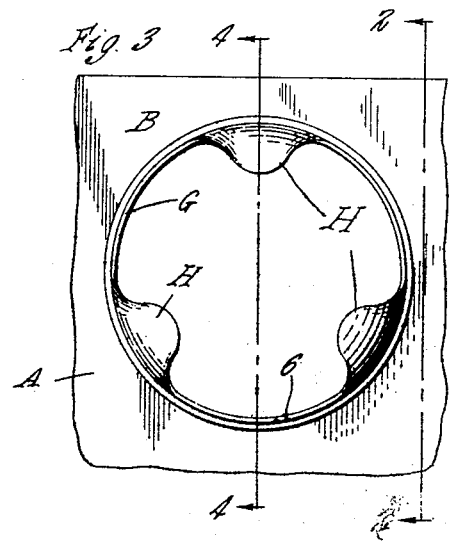
Fig. 3 is an end view of a pipe connection showing the same as it appears when looking toward the interior of the tank.

G represents a pipe connection embodying this invention, the tank shown in Fig. 1 being provided with a pipe connection of this kind at both the inlet and discharge openings thereof. This pipe connection is in the form of a sleeve, preferably made of relatively thin metal, and if desired, this sleeve may be made from a flat sheet of metal bent into cylindrical or tubular form and having two edges of the sheet secured together to form a longitudinal seam, for example, by welding, as indicated at 6 in Fig. 3.

In order to limit the extent to which a pipe, such as a sewer pipe or tile, may be inserted into the connection, the sleeve G is provided at intervals with inwardly extending stop projections H. These stop projections may be formed in any suitable or desired manner, but preferably they are formed by bending the metal adjacent to the inner edge of the sleeve inwardly toward the axis of the sleeve.

The inner faces of these projections slope or incline toward the interior of the tank and toward the axis of the sleeve or connection, and consequently, form substantially wedge shaped projections on the interior of the sleeve. The projections H are spaced at considerable intervals apart, and as many may be employed as desired, three of these stop projections, however, having been found sufficient. The stop projections may be formed in the metal of the sleeve in any suitable or desired manner but preferably they are formed by stretching the metal to produce the projections after the metal has been rolled and welded into the form of a tube. When a sleeve is arranged in a tank, it is preferable to have the projections of the sleeve arranged so that the lower part of the sleeve is free from these projections so that the projections will offer the minimum resistance to the flow of liquid through the sleeves.

Figure 4:
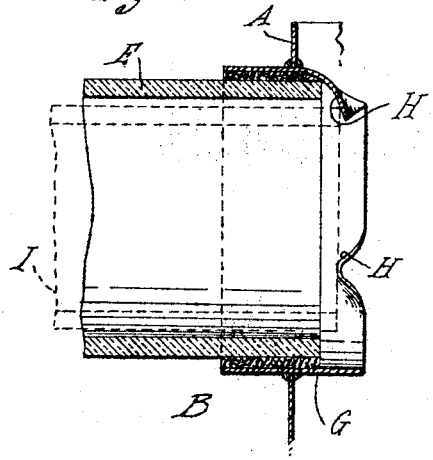
Fig. 4 is a section thereof on line 4—4, Fig. 3, showing a pipe arranged in the pipe connection.

In the use of the pipe connection described, it will be seen by referring to Figs. 1 and 4 that when the pipes E and F are inserted into the connection, the end of each pipe will strike the projections H, and will thus be prevented from passing farther through the sleeve G. The projections are also effective when used in connection with smaller size pipes, as for example the pipe I show in dotted lines in Fig. 4, which engages the inner portions of the projections. By providing the projections with sloping inner faces, several advantages result. In the first place, the projections offer the minimum of resistance to the flow of liquid into the tank, and because of the inclination of the inner faces, the adherence of solid matter carried by liquid flowing into the tank to the projections is prevented, since the inclinations of the inner faces of the projections render the same self-clearing. At the discharge end of the septic tank, this danger of clogging does not exist, since solid matter becomes disintegrated in the tank. In the second place, the tapering faces of the projections facilitate the positioning of pipes of different sizes centrally in the sleeves G in that the projections have a wedging action, tending to center any pipe pressed against the same. This facilitates the making of the usual seal of cement or plastic material between the sleeve G and the pipe.

The construction described also has the advantage that the portions of the connections between the projections or stops are free from obstructions to the flow of liquid, so that the pipe connection offers very little resistance to the flow of liquid therethrough in either direction.

The projections described add little to the cost of the connections, being made of a portion of the material of the sleeves. The projections are very strong and rigid, due to their arch shape, and are, therefore, able to withstand rough handling or blows resulting from the careless insertion of pipes into the connection.

I claim as my invention:

1. A pipe connection for containers, said connection being in the form of a sleeve secured in an opening in a container and having inwardly extending tapering stop projections arranged at intervals on the inner face of said sleeve, said projections tapering toward the axis of said sleeve and toward the interior of the container and limiting the extent to which pipes may be inserted into said sleeve, said sleeve between said portions being free from obstructions to the flow of liquid and of the same contour as the main portion of the sleeve.

2. A pipe connection for tanks, said connection being in the form of a tube rigidly secured in a hole in a tank, and having the end thereof facing the interior of the tank provided at intervals with inwardly extending projections, the surfaces of which slope toward the axis of the tube and toward the interior of the tank to form wedge shaped stops for pipes of different sizes which may be inserted into the connection and offer a smooth inclined surface over which solid matter in liquid flowing into the tank will pass without adhering thereto, the portions of said tube between said projections maintaining the contour of the main portion of said tube.

3. A pipe connection for tanks, said connection being in the form of a metal sleeve rigidly secured in a hole in a tank and having the end thereof facing the interior of the tank formed to provide a plurality of integral stop projections spaced at intervals from each other, the inner faces of said projections tapering toward the axis of said sleeve and toward the interior of said tank to act as a stop for pipes of different sizes which may be inserted into said sleeve, the bottom portion of the sleeve being free from projections to permit draining of the liquid into said tanks.

4. A pipe connection for tanks, said connection being in the form of a metal sleeve rigidly secured in a hole in a tank and having the metal at the inner end thereof stretched at intervals to form a plurality of inwardly extending stop projections, the inner faces of which incline toward the axis of the sleeve and toward the interior of the tank to form wedge shaped parts which limit the extent to which a pipe may be inserted into said sleeve and which tend to center a pipe within said sleeve.

5. A pipe connection for tanks, including a flat strip of metal formed into a tube and having arch shaped projections formed at one edge thereof and rigidly secured in a hole in the tank, with said edge arranged within the tank, said projections being substantially of arch shape and extending inwardly with reference to said pipe connection and having sloping sides inclined toward the axis of the connection and toward the interior of the tank, said projections being spaced from each other and forming stops for limiting the extent to which pipes may be inserted into said connection.

THOMAS BENNETT.